United States Patent
Obata

(10) Patent No.: US 7,751,945 B2
(45) Date of Patent: Jul. 6, 2010

(54) VEHICLE-TO-VEHICLE COMMUNICATION APPARATUS, VEHICLE-TO-VEHICLE COMMUNICATION SYSTEM, AND METHOD OF DETERMINING APPLICABILITY OF MOVING IMAGE INFORMATION TO AN APPLICATION PROGRAM

(75) Inventor: Kijuro Obata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1006 days.

(21) Appl. No.: 11/494,276

(22) Filed: Jul. 27, 2006

(65) Prior Publication Data

US 2007/0038772 A1    Feb. 15, 2007

(30) Foreign Application Priority Data

Aug. 11, 2005    (JP) .............................. 2005-232860

(51) Int. Cl.
*G06F 17/00* (2006.01)
(52) U.S. Cl. .............................. 701/1; 701/23; 701/200; 701/208; 701/300; 701/301; 340/902; 340/905; 340/937; 340/995.13; 340/988; 348/113; 348/116; 348/148; 348/159; 348/317; 455/63.1; 455/67.11; 455/414.1; 455/456.1
(58) Field of Classification Search .................. None
See application file for complete search history.

(56) References Cited

U.S. PATENT DOCUMENTS

| | | | | |
|---|---|---|---|---|
| 6,807,467 B2* | 10/2004 | Yanai | ............................ | 701/1 |
| 7,010,428 B2* | 3/2006 | Kanemitsu | ................... | 701/300 |
| 7,133,767 B2* | 11/2006 | Ogino et al. | ................. | 701/200 |
| 7,142,130 B2* | 11/2006 | Mukaiyama | ................. | 340/937 |
| 7,304,589 B2* | 12/2007 | Kagawa | ................. | 340/995.13 |
| 7,477,307 B2* | 1/2009 | Suzuki et al. | ................ | 348/317 |
| 2001/0006525 A1* | 7/2001 | Mizuguchi et al. | ........... | 370/538 |
| 2003/0221010 A1* | 11/2003 | Yoneya et al. | ................ | 709/227 |
| 2004/0119818 A1* | 6/2004 | Mukaiyama | ................. | 348/116 |
| 2004/0122587 A1* | 6/2004 | Kanemitsu | ................... | 701/200 |
| 2004/0128062 A1* | 7/2004 | Ogino et al. | ................. | 701/200 |
| 2004/0138809 A1* | 7/2004 | Mukaiyama | ................. | 701/200 |
| 2004/0157560 A1* | 8/2004 | Yamasaki | ................... | 455/63.1 |
| 2004/0174977 A1* | 9/2004 | Kanemitsu | ................... | 379/219 |
| 2004/0210358 A1* | 10/2004 | Suzuki et al. | ................. | 701/23 |
| 2005/0088318 A1* | 4/2005 | Liu et al. | .................... | 340/902 |
| 2005/0225457 A1* | 10/2005 | Kagawa | ................. | 340/995.13 |

* cited by examiner

*Primary Examiner*—Khoi Tran
*Assistant Examiner*—Jonathan Sample
(74) *Attorney, Agent, or Firm*—Brinks Hofer Gilson & Lion

(57) ABSTRACT

In a vehicle-to-vehicle communication system, when moving image information is transmitted between vehicles, a delay time acquisition unit determines a delay time that occurs when the moving image information is transmitted from a first vehicle to a second vehicle, and an applicability determination unit determines whether the moving image information transmitted with such a delay time is applicable to an application program running on an in-vehicle apparatus installed in the second vehicle. This makes it possible to transmit only moving image information which is usable by the in-vehicle apparatus.

9 Claims, 9 Drawing Sheets

FIG. 2

| APPLICATION PROGRAM | ALLOWABLE DELAY TIME |
|---|---|
| COLLISION AVOIDANCE | t1 |
| MERGE ASSISTANCE | t2 |
| SURROUNDING MONITOR | t3 |
| PARKING ASSISTANCE | t4 |
| VIDEO TELEPHONE | t5 |
| DRIVE RECORDER | t6 |
| CONGESTION MONITOR | t7 |

SHORTER
↑
ALLOWABLE
DELAY TIME
↓
LONGER

FIG. 9

| APPLICATION PROGRAM | REQUIRED RESOLUTION |
|---|---|
| VEHICLE RECOGNITION FOR COLLISION AVOIDANCE | P1 |
| VEHICLE RECOGNITION FOR MERGE ASSISTANCE | P2 |
| SURROUNDING MONITOR | P3 |
| PARKING ASSISTANCE DISPLAY | P4 |
| DRIVE RECORDER | P5 |
| CONGESTION MONITOR | P6 |
| VIDEO TELEPHONE | P7 |

HIGHER
↑
REQUIRED RESOLUTION
↓
LOWER

VEHICLE-TO-VEHICLE COMMUNICATION APPARATUS, VEHICLE-TO-VEHICLE COMMUNICATION SYSTEM, AND METHOD OF DETERMINING APPLICABILITY OF MOVING IMAGE INFORMATION TO AN APPLICATION PROGRAM

BACKGROUND OF THE INVENTION

1. Field of the Invention

The present invention relates to a vehicle-to-vehicle communication apparatus, a vehicle-to-vehicle communication system, and a method of determining applicability of moving image information to an application program, and more particularly to a vehicle-to-vehicle communication apparatus, a vehicle-to-vehicle communication system, and a method of determining applicability of moving image information to an application program which are suitable for use in a vehicle-to-vehicle communication apparatus having a capability of transmitting/receiving moving image information.

2. Description of the Related Art

In recent years, great advances have been achieved in communication technology. In particular, a vehicle-to-vehicle communication technique using communication means such as a wireless LAN, Bluetooth, or specified low power radio equipment has received attention. A vehicle-to-vehicle communication apparatus installed in a vehicle allows it to perform wireless communication with another nearby vehicle, whereby various kinds of information acquired from the nearby vehicle via vehicle-to-vehicle communication can be displayed on a monitor screen of an in-vehicle navigation apparatus or the like.

Some vehicle-to-vehicle communication apparatus have a capability of transmitting/receiving moving image information. In such vehicle-to-vehicle communication apparatus, for example, it is possible to transmit moving image information taken by a camera installed in a first vehicle to a second vehicle via vehicle-to-vehicle communication and display the acquired moving image information on a monitor screen of the second vehicle. When an image taken by a camera installed in a first vehicle traveling ahead of a second vehicle is displayed on a monitor screen of the second vehicle, it is known to select a proper image to be displayed (see, for example, Japanese Unexamined Patent Application Publication No. 2004-139284). This publication also discloses a technique to control a process according to a preset program such that when a particular condition is met, particular information is automatically acquired from another vehicle via vehicle-to-vehicle communication and is used as required.

In recent years, various in-vehicle application programs have been provided which use moving image information. Specific examples of application programs are a merge support program and a congestion monitor program for use with a navigation apparatus, a collision avoidance program and a surrounding monitor program for detecting a nearby vehicle or an obstacle using moving image information, a parking assistance program, a video telephone program, and a drive recorder program. Moving image information acquired from another vehicle via vehicle-to-vehicle communication can also be used by these application programs.

However, the requirement for low transmission delay and/or high image quality of moving image information varies depending on the application program which uses the moving image information. In other words, moving image information acquired from another vehicle via vehicle-to-vehicle communication is not always applicable to all application programs. However, in the conventional vehicle-to-vehicle communication apparatus, the applicability of moving image information to application programs is not taken into account at all.

SUMMARY OF THE INVENTION

In view of the above, it is an object of the present invention to provide a technique to apply moving image information acquired via vehicle-to-vehicle communication only to an application program which can productively use the moving image information.

Accordingly, to achieve the above object, the present invention provides a vehicle-to-vehicle communication apparatus, a vehicle-to-vehicle communication system, and a method of determining applicability of moving image information to an application program, in which a delay time that occurs when moving image information is transmitted from a first vehicle to a second vehicle in vehicle-to-vehicle communication is determined, and a further determination is made as to whether the moving image information which will be transmitted with such a delay can be used by an application program running in the second vehicle.

More specifically, according to one aspect of the present invention, there is provided a vehicle-to-vehicle communication apparatus comprising a wireless communication unit configured to wirelessly transmit and receive moving image information, a time delay acquisition unit configured to acquire delay time information indicating a delay time that occurs when the moving image information is transmitted from one vehicle to another vehicle in vehicle-to-vehicle transmission performed by the wireless communication unit, an allowable delay table memory in which there is stored table information indicating an allowable delay time determined for each of the application programs which use the moving image information, and an applicability determination unit configured to determine the applicability of the moving image information to the application programs based on the delay time information acquired by the delay time acquisition unit and the table information stored in the allowable delay table memory.

According to another aspect of the present invention, there is provided a vehicle-to-vehicle communication apparatus comprising a wireless communication unit configured to wirelessly transmit and receive moving image information, an image quality acquisition unit configured to acquire image quality information associated with the moving image information when the moving image information is transmitted between vehicles by the wireless communication unit, an allowable image quality table memory in which there is stored table information indicating allowable image quality determined for each of the application programs which use the moving image information, and an applicability determination unit configured to determine the applicability of the moving image information to the application programs based on the image quality information acquired by the image quality acquisition unit and the table information stored in the allowable image quality table memory.

According to another aspect of the present invention, there is provided a vehicle-to-vehicle communication system for wirelessly transmitting and receiving moving image information between a first vehicle-to-vehicle communication apparatus installed in a first vehicle and a second vehicle-to-vehicle communication apparatus installed in a second vehicle, the first vehicle-to-vehicle communication apparatus including a time delay acquisition unit configured to acquire delay time information indicating a delay time that occurs when the moving image information is transmitted from the first vehicle to the second vehicle, and a wireless transmission unit configured to wirelessly transmit the delay time information acquired by the time delay acquisition unit and the moving image information to the second vehicle-to-vehicle communication apparatus, the second vehicle-to-vehicle communication apparatus including a wireless reception unit configured to receive the moving image information and the delay time information transmitted from the wireless transmission unit, an allowable delay table memory in which there is stored table information indicating an allowable delay time determined for each of the application programs which use the moving image information, and an applicability determination unit configured to determine the applicability of the moving image information received by the wireless reception unit to the application programs, based on the delay time information received by the wireless reception unit and the table information stored in the allowable delay table memory.

According to another aspect of the present invention, there is provided a vehicle-to-vehicle communication system for wirelessly transmitting and receiving moving image information between a first vehicle-to-vehicle communication apparatus installed in a first vehicle and a second vehicle-to-vehicle communication apparatus installed in a second vehicle, the first vehicle-to-vehicle communication apparatus including an image quality acquisition unit configured to acquire image quality information associated with the moving image information, and a wireless transmission unit configured to wirelessly transmit the image quality information acquired by the image quality acquisition unit and the moving image information to the second vehicle-to-vehicle communication apparatus, the second vehicle-to-vehicle communication apparatus including a wireless reception unit configured to receive the moving image information and the image quality information transmitted from the wireless transmission unit, an allowable image quality table memory in which there is stored table information indicating allowable image quality determined for each of the application programs which use the moving image information, and an applicability determination unit configured to determine the applicability of the moving image information received by the wireless reception unit to the application programs, based on the image quality information received by the wireless reception unit and the table information stored in the allowable image quality table memory.

According to another aspect of the present invention, there is provided a method of determining the applicability of moving image information to an application program, comprising a first step in which a time delay acquisition unit included in a first vehicle-to-vehicle communication apparatus installed in a first vehicle acquires delay time information indicating a delay time that occurs when the moving image information is transmitted from the first vehicle to the second vehicle, a second step in which a wireless transmission unit included in the first vehicle-to-vehicle communication apparatus transmits the moving image information together with the delay time information acquired in the first step to the second vehicle-to-vehicle communication apparatus installed in the second vehicle, a third step in which a wireless reception unit included in the second vehicle-to-vehicle communication apparatus receives the moving image information and the delay time information transmitted in the second step, and a fourth step in which an applicability determination unit included in the second vehicle-to-vehicle communication apparatus determines the applicability of the moving image information received in the third step to the application program, based on the delay time information received in the third step and table information indicating an allowable delay time determined for each of the application programs which use the moving image information.

According to another aspect of the present invention, there is provided a method of determining the applicability of moving image information to an application program, comprising a first step in which a time delay acquisition unit included in a first vehicle-to-vehicle communication apparatus installed in a first vehicle acquires delay time information indicating a delay time that occurs when the moving image information is transmitted from the first vehicle to the second vehicle, a second step in which a wireless transmission unit included in the first vehicle-to-vehicle communication apparatus transmits the delay time information acquired in the first step to the second vehicle-to-vehicle communication apparatus installed in the second vehicle, a third step in which a wireless reception unit included in the second vehicle-to-vehicle communication apparatus receives the delay time information transmitted in the second step, a fourth step in which an applicability determination unit included in the second vehicle-to-vehicle communication apparatus determines the applicability of moving image information, which will be transmitted from the first vehicle-to-vehicle communication apparatus, to the application program based on the delay time information received in the third step and table information indicating an allowable delay time determined for each of the application programs which use the moving image information, a fifth step in which when the determination in the fourth step is that the moving image information is applicable to the application program, a request transmission unit included in the second vehicle-to-vehicle communication apparatus transmits a request for transmission of the moving image information to the first vehicle-to-vehicle communication apparatus, a sixth step in which a request reception unit included in the first vehicle-to-vehicle communication apparatus receives the request for transmission of the moving image information transmitted in the fifth step, and a seventh step in which when the request for transmission of the moving image information is received in the sixth step, the wireless transmission unit included in the first vehicle-to-vehicle communication apparatus transmits the moving image information to the second vehicle-to-vehicle communication apparatus.

According to another aspect of the present invention, there is provided a method of determining the applicability of moving image information to an application program, comprising a first step in which an image quality acquisition unit included in a first vehicle-to-vehicle communication apparatus installed in a first vehicle acquires image quality information associated with the moving image information, a second step in which a wireless transmission unit included in the first vehicle-to-vehicle communication apparatus transmits the moving image information together with the image quality information acquired in the first step to a second vehicle-to-vehicle communication apparatus installed in a second vehicle, a third step in which a wireless reception unit included in the second vehicle-to-vehicle communication apparatus receives the moving image information and the image quality information transmitted in the second step, and a fourth step in which an applicability determination unit included in the second vehicle-to-vehicle communication apparatus determines the applicability of the moving image information received in the third step to the application program based on the image quality information received in the third step and table information indicating allowable image quality determined for each of the application programs which use the moving image information.

According to another aspect of the present invention, there is provided a method of determining the applicability of moving image information to an application program, comprising a first step in which an image quality acquisition unit included in a first vehicle-to-vehicle communication apparatus installed in a first vehicle acquires image quality information associated with the moving image information, a second step in which a wireless transmission unit included in the first vehicle-to-vehicle communication apparatus transmits the image quality information acquired in the first step to a second vehicle-to-vehicle communication apparatus installed in a second vehicle, a third step in which a wireless reception unit included in the second vehicle-to-vehicle communication apparatus receives the image quality information transmitted in the second step, a fourth step in which an applicability determination unit included in the second vehicle-to-vehicle communication apparatus determines the applicability of moving image information, which will be transmitted from the first vehicle-to-vehicle communication apparatus, to the application program based on the image quality information received in the third step and table information indicating allowable image quality determined for each of the application programs which use the moving image information, a fifth step in which when the determination in the fourth step is that the moving image information is applicable to the application program, a request transmission unit included in the second vehicle-to-vehicle communication apparatus transmits a request for transmission of the moving image information to the first vehicle-to-vehicle communication apparatus, a sixth step in which a request reception unit included in the first vehicle-to-vehicle communication apparatus receives the request for transmission of the moving image information transmitted in the fifth step, and a seventh step in which when the request for transmission of the moving image information is received in the sixth step, the wireless transmission unit included in the first vehicle-to-vehicle communication apparatus transmits the moving image information to the second vehicle-to-vehicle communication apparatus.

The present invention provides advantages as described below. Moving image information is generally large in data size, which can result in a delay when the moving image information is transmitted from one vehicle to another vehicle via vehicle-to-vehicle communication. If the resolution of moving image information captured by a camera is not high enough, sufficiently high image quality cannot be obtained from the transmitted moving image information. Even if the resolution of original moving image information is high, degradation in image quality can occur depending on the encoding method, the compression rate, and/or the frame rate employed for transmission of the moving image information. Thus, moving image information acquired from another vehicle via vehicle-to-vehicle communication is not always applicable to all application programs. The problems described above can be solved by the present invention. That is, according to the present invention, the determination is made as to whether moving image information is applicable to application programs, and the moving image information is applied only to application programs which can productively use the moving image information.

BRIEF DESCRIPTION OF THE DRAWINGS

FIG. 2 is a table indicating an example of the content of table information stored in an allowable delay table memory;

FIG. 9 is a table indicating an example of the content of table information stored in an allowable image quality table memory.

DESCRIPTION OF THE PREFERRED EMBODIMENTS

First Embodiment

Figure 1:
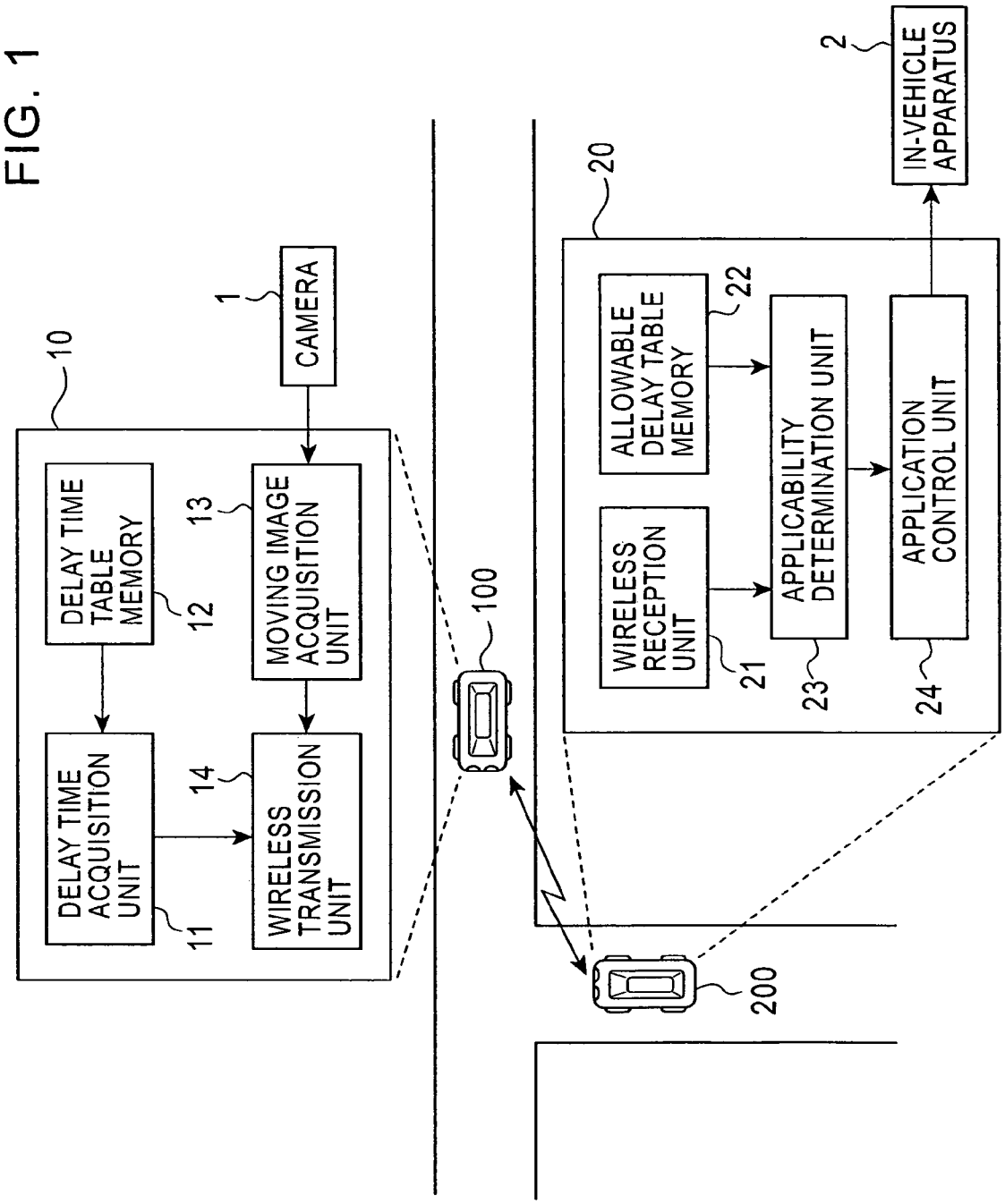
FIG. 1 is a functional block diagram showing a vehicle-to-vehicle communication apparatus and a vehicle-to-vehicle communication system using the vehicle-to-vehicle communication apparatus according to a first embodiment of the present invention.

A first embodiment of the present invention is described below with reference to the accompanying drawings. FIG. 1 is a functional block diagram showing a vehicle-to-vehicle communication apparatus and a vehicle-to-vehicle communication system using the vehicle-to-vehicle communication apparatus according to the first embodiment. As shown in FIG. 1, the vehicle-to-vehicle communication system according to the first embodiment includes a first vehicle-to-vehicle communication apparatus 10 installed in a first vehicle 100, and a second vehicle-to-vehicle communication apparatus 20 installed in a second vehicle 200 whereby moving image information can be wirelessly transmitted between the vehicle-to-vehicle communication apparatus 10 and 20.

The first vehicle-to-vehicle communication apparatus 10 includes, as functional components, a delay time acquisition unit 11, a delay time table memory 12, a moving image acquisition unit 13, and a wireless transmission unit 14. The delay time acquisition unit 11 acquires time delay information indicating a delay time that occurs in transmission of moving image information from the first vehicle 100 to the second vehicle 200. More specifically, the delay time acquisition unit 11 reads the delay time table memory 12 in which a predicted delay time due to encoding of the moving image performed by the moving image acquisition unit 13, a predicted delay time due to compression of the moving image, a predicted delay time due to wireless transmission performed by the wireless transmission unit 14, etc., have been stored in advance, and the delay time acquisition unit 11 acquires the time delay information indicating the delay time that occurs in transmission of the moving image information from the first vehicle 100 to the second vehicle 200 by calculating the sum of various delay times stored in the table information. Alternatively, the total predicted delay time may be stored in advance in the delay time table memory 12.

The moving image acquisition unit 13 acquires the moving image information taken, for example, by a camera 1. The camera 1 is installed, for example, in the front of the first vehicle 100 so that a moving image of a view ahead of the first vehicle 100 can be taken, or the camera 1 is installed in the first vehicle 100 so that an image of the inside of the vehicle can be taken. The first vehicle-to-vehicle communication apparatus 10 and the camera 1 are connected, for example, via an in-vehicle LAN so that moving image information taken by the camera 1 is supplied via the in-vehicle LAN to the moving image acquisition unit 13 of the first vehicle-to-vehicle communication apparatus 10. The moving image information taken by camera 1 and supplied to the moving image acquisition unit 13 has a predetermined resolution and is supplied at a predetermined frame rate. The moving image information is then compressed at a predetermined compression rate in accordance with a predetermined encoding method.

The wireless transmission unit 14 wirelessly transmits the time delay information acquired by the delay time acquisition unit 11 and the moving image information acquired by the moving image acquisition unit 13 to the second vehicle-to-vehicle communication apparatus 20. In the present embodiment, in the transmission of the delay time information and the moving image information to the second vehicle-to-vehicle communication apparatus 20, the time delay information is transmitted in a form in which it is attached to the moving image information. The wireless transmission of moving image information by the wireless transmission unit 14 may be accomplished using communication means such as a wireless LAN, Bluetooth, or specified low power radio equipment.

The second vehicle-to-vehicle communication apparatus 20 includes, as functional components, a wireless reception unit 21, an allowable delay table memory 22, an applicability determination unit 23, and an application control unit 24. The wireless reception unit 21 receives the moving image information and the time delay information transmitted from the wireless transmission unit 14 of the first vehicle-to-vehicle communication apparatus 10. The wireless reception of moving image information by the wireless reception unit 21 may be accomplished using communication means such as a wireless LAN, Bluetooth, or specified low power radio equipment.

In the allowable delay table memory 22, table information indicating an allowable delay time for each application program that uses moving image information is stored. FIG. 2 is a table indicating an example of the content of the table information stored in the allowable delay table memory 22. As shown in FIG. 2, specific examples of application programs running on the in-vehicle apparatus 2 installed in the second vehicle 200 include a merge support program and a congestion monitor program for use with a navigation apparatus, a collision avoidance program and a surrounding monitor program for detecting a nearby vehicle or an obstacle using moving image information, a parking assistance program, a video telephone program, and a drive recorder program.

The allowable delay time varies depending on these application programs. For example, in the collision avoidance application program, it is strongly required that the moving image information used by the in-vehicle apparatus 2 should be supplied in substantially real time, that is, moving image information of a surrounding view taken by the first vehicle 100 should be transmitted to the second vehicle 200 within a short allowable delay time t1. On the other hand, in the congestion monitor program, the requirement for the real-time transmission of moving image information used by the in-vehicle apparatus 2 is not very stringent, that is, a rather long allowable delay time t7 is allowed within which moving image information of a surrounding view taken by the first vehicle 100 should be transmitted to the second vehicle 200. In the example of the table information shown in FIG. 2, the delay times t1 to t7 of respective application programs are described in the form of a table in which application programs are listed in increasing order of the allowable delay time.

The applicability determination unit 23 determines the applicability of moving image information received by the wireless reception unit 21 to a particular application program, based on the delay time information received by the wireless reception unit 21 and the table information stored in the allowable delay table memory 22. More specifically, it is determined that moving image information is applicable to application programs for which the delay time indicated by the delay time information received by the wireless reception unit 21 is equal to or shorter than allowable delay times described in the table information stored in the allowable delay table memory 22. On the other hand, it is determined that moving image information is not applicable to application programs for which the delay time indicated by the delay time information received by the wireless reception unit 21 is longer than allowable delay times described in the table information stored in the allowable delay table memory 22.

The applicability determination unit 23 may determine the applicability of moving image information for all application programs shown in FIG. 2 or for some of the application programs. In the latter case, for example, the determination of applicability of moving image information may be made for application programs that are currently running on the in-vehicle apparatus 2. The determination as to which application programs are currently running on the in-vehicle apparatus 2 may be made by issuing an inquiry from the second vehicle-to-vehicle communication apparatus 20 to the in-vehicle apparatus 2. Alternatively, when an application program is activated in the second vehicle-to-vehicle communication apparatus 20, information indicating the activated application program may be automatically transmitted from the in-vehicle apparatus 2 to the second vehicle-to-vehicle communication apparatus 20.

The application control unit 24 controls the application of moving image information to an application program in accordance with the result of the determination made by the applicability determination unit 23 as to the applicability of the application program to the moving image information. More specifically, if the applicability determination unit 23 determines that the moving image information is applicable to the application program, the application control unit 24 supplies the moving image information received by the wireless reception unit 21 to the in-vehicle apparatus 2 so that the moving image information can be used by the application program running on the in-vehicle apparatus 2.

On the other hand, when the determination by the applicability determination unit 23 is that the moving image information is not applicable to the application program, application control unit 24 does not supply the moving image information received by the wireless reception unit 21 to the in-vehicle apparatus 2. In this case, a message may be displayed on a display (not shown) or provided from a speaker (not shown) of the in-vehicle apparatus 2 to notify a user that the moving image information is not applicable.

Figure 3:
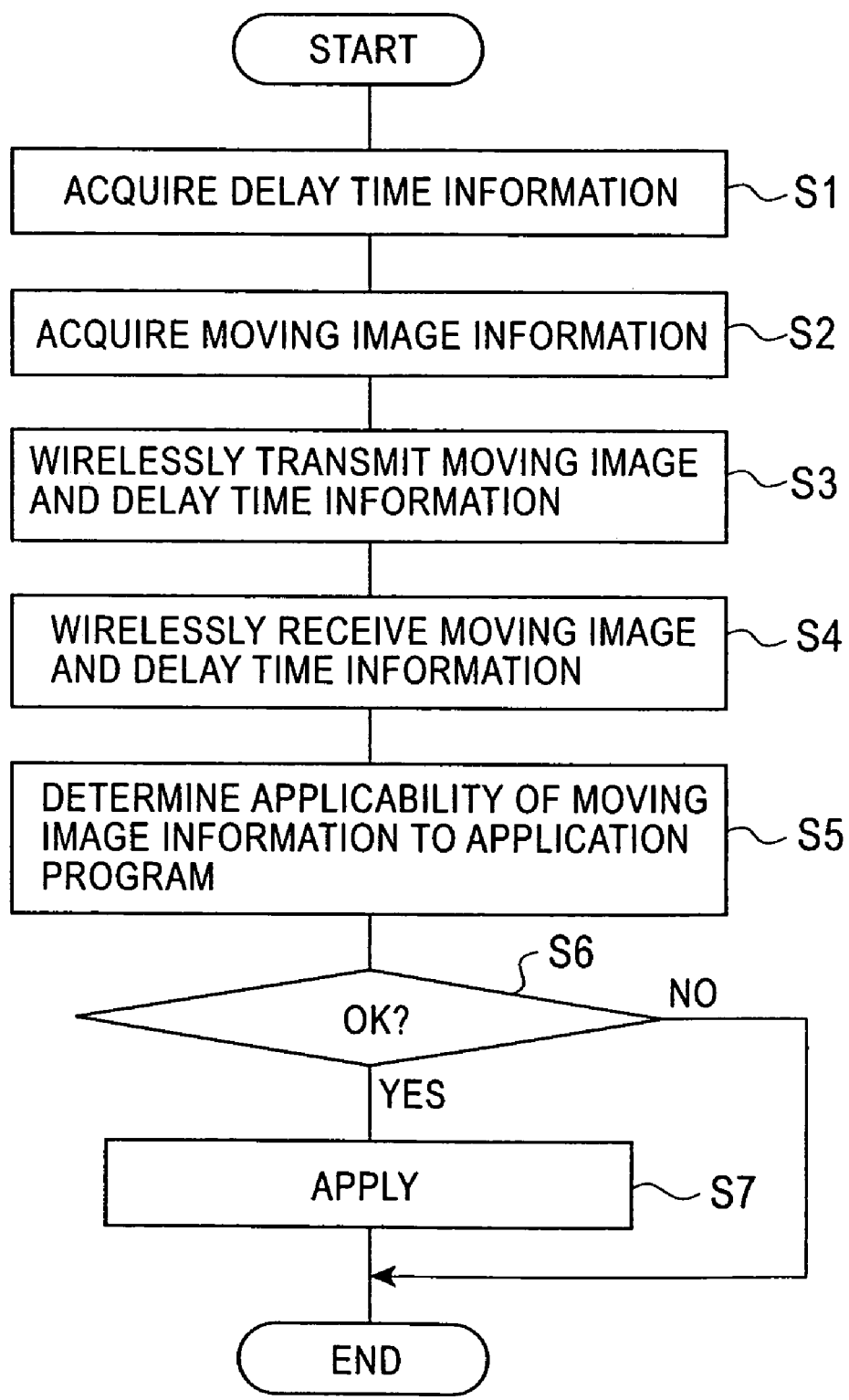
FIG. 3 is a flow chart showing the operation of a vehicle-to-vehicle communication system according to the first embodiment of the present invention.

The operation performed by the vehicle-to-vehicle communication system to determine the applicability of moving image information to application programs according to the first embodiment is described below. FIG. 3 is a flow chart showing the operation of the vehicle-to-vehicle communication system according to the first embodiment.

As shown in FIG. 3, the delay time acquisition unit 11 of the first vehicle-to-vehicle communication apparatus 10 installed in the first vehicle 100 reads data stored in the delay time table memory 12 to acquire delay time information indicating the delay time that occurs when moving image information is transmitted from the first vehicle 100 to the second vehicle 200 (step S1). The moving image acquisition unit 13 acquires the moving image information taken by the camera 1 (step S2). Note that the acquisition of the delay time information is performed intermittently, while the acquisition of the moving image information is performed continuously.

The wireless transmission unit 14 transmits the moving image information acquired in step S2, together with the delay time information acquired in step S1, to the second vehicle-to-vehicle communication apparatus 20 (step S3). More specifically, the delay time information is transmitted at the beginning of the wireless transmission and subsequently the moving image information is transmitted. The delay time information and the moving image information transmitted in step S3 are received by the wireless reception unit 21 of the second vehicle-to-vehicle communication apparatus 20 (step S4).

If the wireless reception unit 21 first receives the delay time information, the applicability determination unit 23 determines the applicability of the moving image information received by the wireless reception unit 21 to an application program, based on the received delay time information and the table information stored in the allowable delay table memory 22 (step S5). The wireless reception unit 21 continuously receives the moving image information from the wireless transmission unit 14 over the entire period during which the applicability determination unit 23 makes the determination, and the received moving image information is sequentially stored in a buffer memory (not shown). Note that the determination by the applicability determination unit 23 is completed in a very short time, and thus the amount of the moving image information stored in the buffer memory is not great.

The application control unit 24 determines whether the determination made by the applicability determination unit 23 is that the moving image information is applicable to the application program (step S6). If the moving image information is determined to be applicable to the application program, the moving image information stored in the buffer memory is sequentially supplied to the in-vehicle apparatus 2 so that the moving image information received by the wireless reception unit 21 can be used by the application program of the in-vehicle apparatus 2 (step S7). On the other hand, if it is determined that the moving image information is not applicable to the application program, the process is ended without supplying the moving image information received by the wireless reception unit 21 to the in-vehicle apparatus 2.

In the first embodiment of the present invention, as described above in detail, when moving image information is transmitted from the first vehicle 100 to the second vehicle 200, the delay time that occurs in the transmission of the moving image information from the first vehicle 100 to the second vehicle 200 is determined, and a further determination is made as to whether the moving image information transmitted with such a delay time can be used by an application program of the second vehicle 200. This makes it possible to apply moving image information only to application programs for which the moving image information is usable even if such a delay occurs in the vehicle-to-vehicle transmission from the first vehicle 100 to the second vehicle 200.

In the above explanation, by way of example, it is assumed that moving image information is transmitted from the first vehicle 100 to the second vehicle 200. Conversely, moving image information may be transmitted from the second vehicle 200 to the first vehicle 100. To this end, it is desirable that both the first vehicle 100 and the second vehicle 200 have all functions described above for the first vehicle-to-vehicle communication apparatus 10 and the second vehicle-to-vehicle communication apparatus 20. In this case, each vehicle has a wireless communication unit including a wireless transmission unit equivalent to the wireless transmission unit 14 and a wireless reception unit equivalent to the wireless reception unit 21.

Second Embodiment

Figure 4:
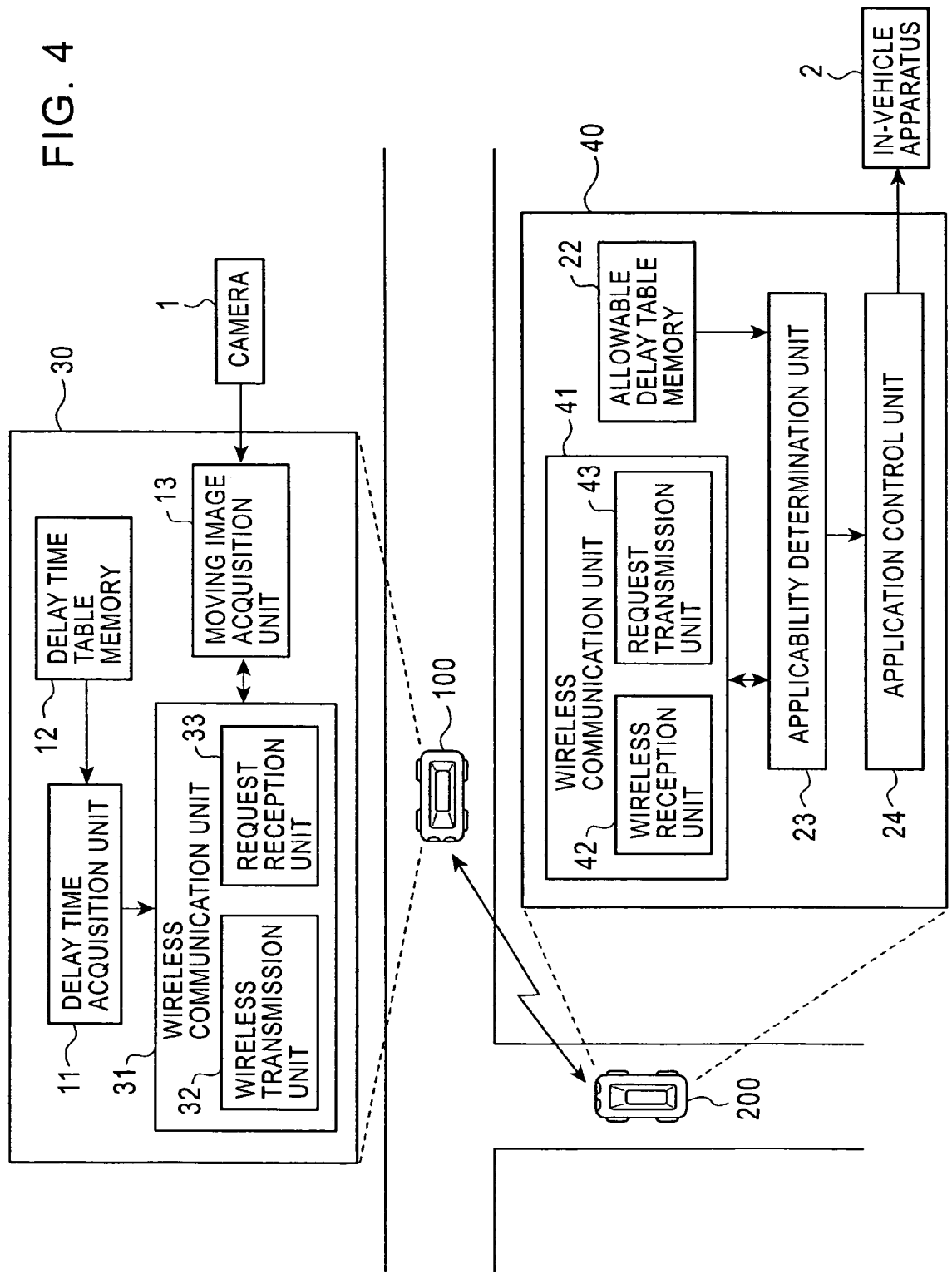
FIG. 4 is a functional block diagram showing a vehicle-to-vehicle communication apparatus and a vehicle-to-vehicle communication system using the vehicle-to-vehicle communication apparatus according to a second embodiment of the present invention.

A second embodiment of the present invention is described below with reference to the accompanying drawings. FIG. 4 is a functional block diagram showing a vehicle-to-vehicle communication apparatus and a vehicle-to-vehicle communication system using the vehicle-to-vehicle communication apparatus according to the second embodiment. In FIG. 4, parts similar to those in FIG. 1 are denoted by similar reference numerals, and a duplicated explanation thereof is omitted.

As shown in FIG. 4, the vehicle-to-vehicle communication system according to the second embodiment includes a first vehicle-to-vehicle communication apparatus 30 installed in a first vehicle 100 and a second vehicle-to-vehicle communication apparatus 40 installed in a second vehicle 200 whereby moving image information can be wirelessly transmitted between the vehicle-to-vehicle communication apparatus 30 and 40.

The first vehicle-to-vehicle communication apparatus 30 includes, as functional components, a delay time acquisition unit 1, a delay time table memory 12, a moving image acquisition unit 13, and a wireless communication unit 31. The wireless communication unit 31 includes a wireless transmission unit 32 and a request reception unit 33. In the first embodiment described above, the wireless transmission unit 14 transmits moving image information together with delay time information. In contrast, in the second embodiment, the wireless transmission unit 32 transmits delay time information and moving image information separately.

More specifically, the wireless transmission unit 32 first transmits wirelessly delay time information acquired by the delay time acquisition unit 11 to the second vehicle-to-vehicle communication apparatus 40. If the request reception unit 33 receives a moving image information transmission request as a response to the delay time information transmitted to the second vehicle-to-vehicle communication apparatus 40, the wireless transmission unit 32 wirelessly transmits moving image information acquired by the moving image acquisition unit 13 to the second vehicle-to-vehicle communication apparatus 40.

The second vehicle-to-vehicle communication apparatus 40 includes, as functional components, a wireless communication unit 41, an allowable delay table memory 22, an applicability determination unit 23, and an application control unit 24. The wireless communication unit 41 includes a wireless reception unit 42 and a request transmission unit 43. In the first embodiment described above, the wireless reception unit 21 receives moving image information together with delay time information. In contrast, in the second embodiment, the wireless reception unit 42 receives delay time information and moving image information separately.

More specifically, the wireless reception unit 42 first receives delay time information transmitted by the wireless transmission unit 32 of the first vehicle-to-vehicle communication apparatus 30. The applicability determination unit 23 determines the applicability of moving image information, which will be transmitted from the first vehicle-to-vehicle communication apparatus 30, to an application program based on the delay time information received by the wireless reception unit 42 and the table information stored in the allowable delay table memory 22. If the determination made by the applicability determination unit 23 is that the moving image information is applicable to the application program, the request transmission unit 43 wirelessly transmits a moving image information transmission request to the first vehicle-to-vehicle communication apparatus 30. In response to the moving image information transmission request, the first vehicle-to-vehicle communication apparatus 30 transmits moving image information, which is received by the wireless reception unit 42.

Figure 5:
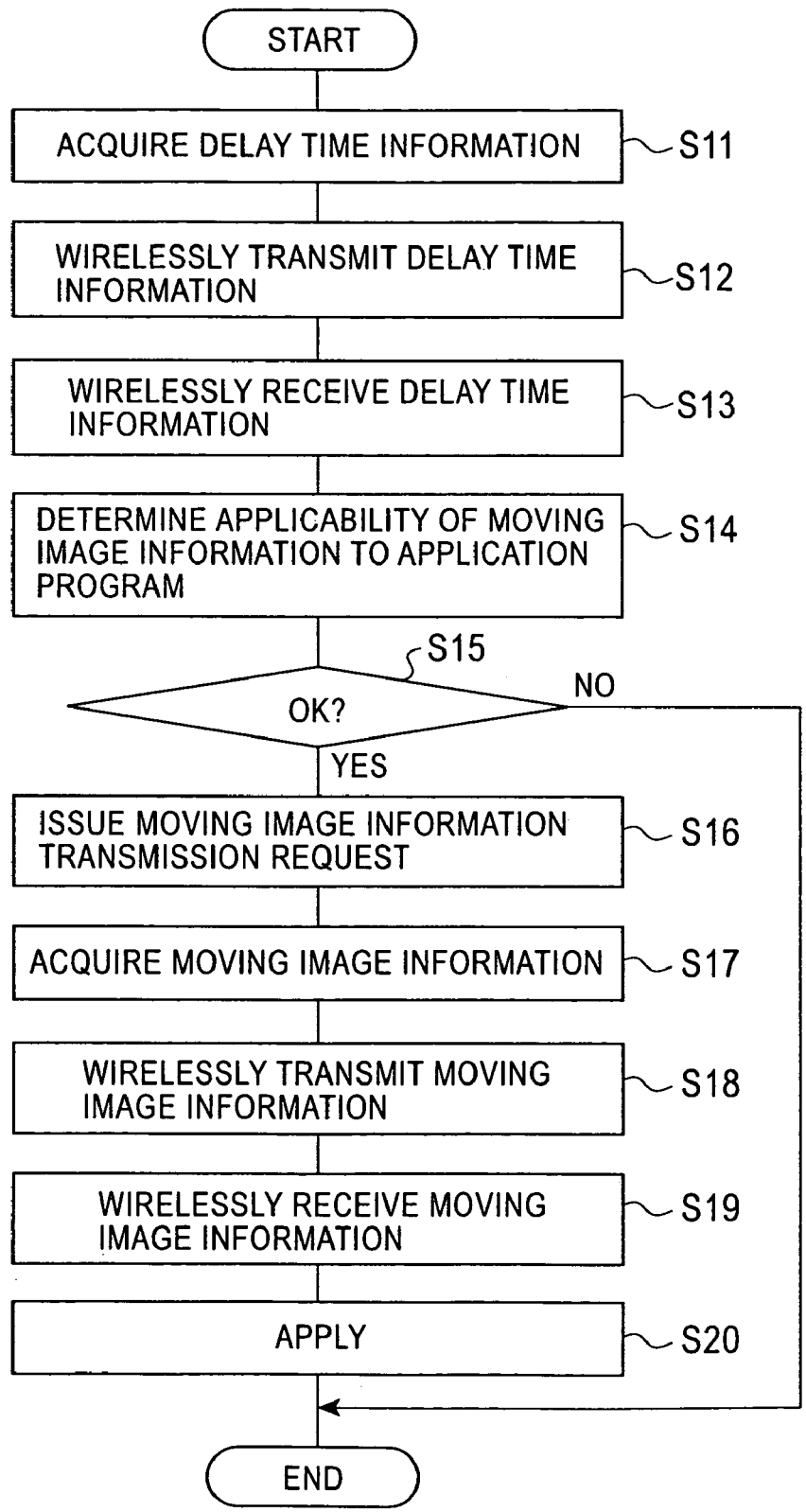
FIG. 5 is a flow chart showing the operation of a vehicle-to-vehicle communication system according to the second embodiment of the present invention.

The operation performed by the vehicle-to-vehicle communication system to determine the applicability of moving image information to application programs according to the second embodiment is described below. FIG. 5 is a flow chart showing the operation of the vehicle-to-vehicle communication system according to the second embodiment.

As shown in FIG. 5, the delay time acquisition unit 11 of the first vehicle-to-vehicle communication apparatus 30 installed in the first vehicle 100 reads data stored in the delay time table memory 12 to acquire delay time information indicating the delay time that occurs when moving image information is transmitted from the first vehicle 100 to the second vehicle 200 (step S11). The wireless transmission unit 32 transmits the delay time information acquired in step S11 to the second vehicle-to-vehicle communication apparatus 40 (step S12). The delay time information transmitted in step S12 is received by the wireless reception unit 42 of the second vehicle-to-vehicle communication apparatus 40 (step S13).

If the wireless reception unit 42 receives the delay time information, then the applicability determination unit 23 determines the applicability of moving image information, which will be transmitted from the first vehicle-to-vehicle communication apparatus 30, to an application program based on the received delay time information and the table information stored in the allowable delay table memory 22 (step S14). The request transmission unit 43 determines whether the determination made by the applicability determination unit 23 is that the moving image information is applicable to the application program (step S15). If the moving image information is determined to be not applicable to the application program, the process is ended. On the other hand, if it is determined that the moving image information is applicable to the application program, the request transmission unit 43 transmits a moving image information transmission request to the first vehicle-to-vehicle communication apparatus 30 (step S16).

If the request reception unit 33 receives the moving image information transmission request, the moving image acquisition unit 13 acquires moving image information taken by the camera 1 (step S17). The wireless transmission unit 32 transmits the moving image information acquired in step S17 to the second vehicle-to-vehicle communication apparatus 40 (step S18). The moving image information transmitted in step S18 is received by the wireless reception unit 42 of the second vehicle-to-vehicle communication apparatus 40 (step S19). The application control unit 24 sequentially supplies the moving image information received by the wireless reception unit 42 to the in-vehicle apparatus 2 so that the application program of the in-vehicle apparatus 2 can use the moving image information (step S20).

In this second embodiment of the present invention, as described above in detail, when moving image information is transmitted from the first vehicle 100 to the second vehicle 200, the delay time that occurs in the transmission of the moving image information from the first vehicle 100 to the second vehicle 200 is determined, and the determination is made as to whether the moving image information transmitted with such a delay time can be used by an application program of the second vehicle 200. This makes it possible to apply moving image information only to application programs for which the moving image information is usable even if such a delay occurs in the vehicle-to-vehicle transmission from the first vehicle 100 to the second vehicle 200.

Furthermore, in the second embodiment, only delay time information is first transmitted from the first vehicle 100 to the second vehicle 200, and subsequently, only when moving image information is determined to be usable by an application program, the moving image information is transmitted from the first vehicle 100 to the second vehicle 200. This makes it possible to prevent moving image information with a large data size from being uselessly transmitted.

In the above explanation, by way of example, it is assumed that moving image information is transmitted from the first vehicle 100 to the second vehicle 200. Conversely, moving image information may be transmitted from the second vehicle 200 to the first vehicle 100. To this end, it is desirable that both the first vehicle 100 and the second vehicle 200 have all functions described above for the first vehicle-to-vehicle communication apparatus 30 and the second vehicle-to-vehicle communication apparatus 40.

Third Embodiment

Figure 6:
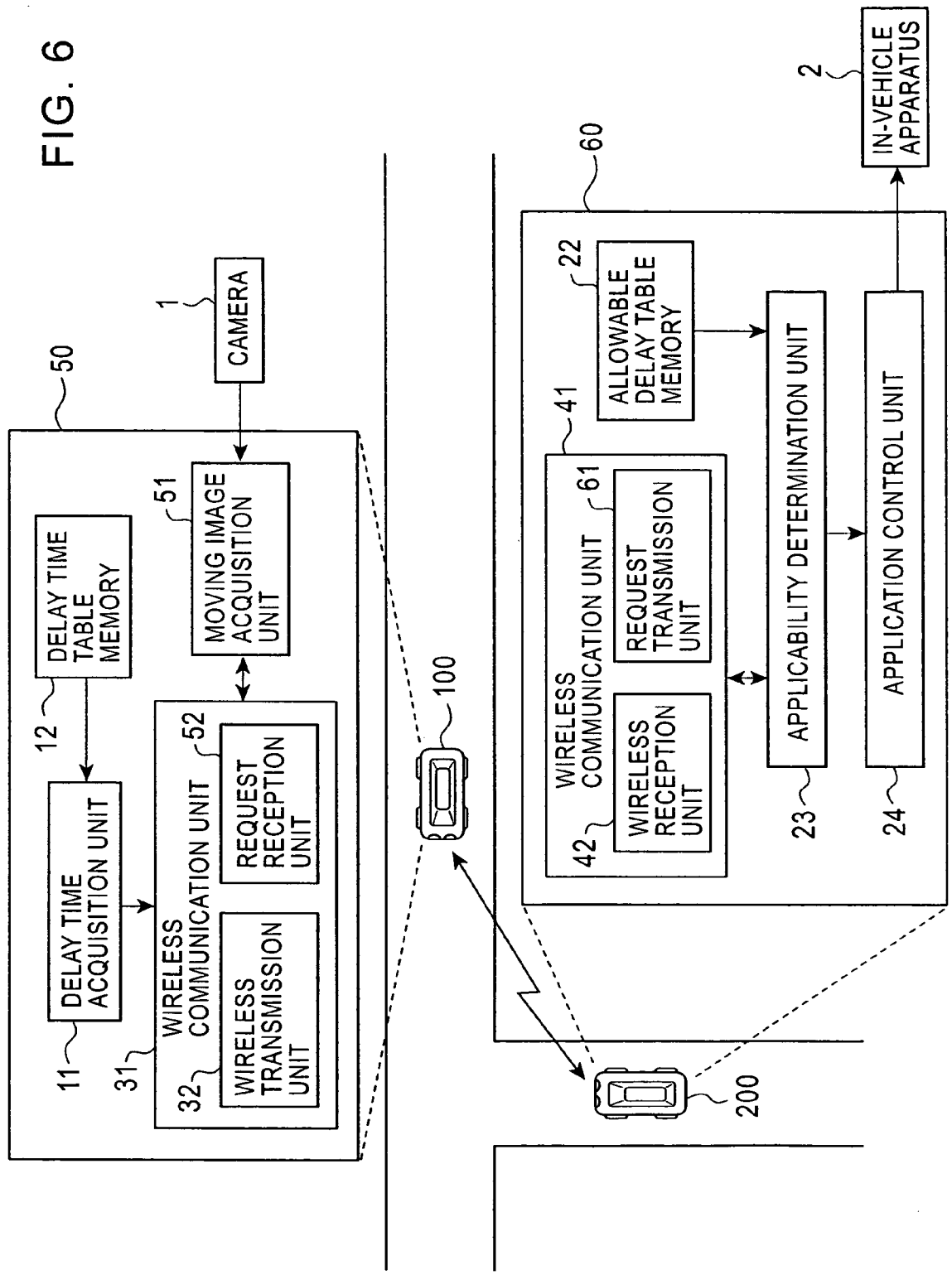
FIG. 6 is a functional block diagram showing a vehicle-to-vehicle communication apparatus and a vehicle-to-vehicle communication system using the vehicle-to-vehicle communication apparatus according to a third embodiment of the present invention.

A third embodiment of the present invention is described below with reference to the accompanying drawings. FIG. 6 is a functional block diagram showing a vehicle-to-vehicle communication apparatus and a vehicle-to-vehicle communication system using the vehicle-to-vehicle communication apparatus according to the third embodiment. In FIG. 6, parts similar to those in FIG. 4 are denoted by similar reference numerals, and a duplicated explanation thereof is omitted.

As shown in FIG. 6, the vehicle-to-vehicle communication system according to the third embodiment includes a first vehicle-to-vehicle communication apparatus 50 installed in a first vehicle 100 and a second vehicle-to-vehicle communication apparatus 60 installed in a second vehicle 200 whereby moving image information can be wirelessly transmitted between the vehicle-to-vehicle communication apparatus 50 and 60.

The first vehicle-to-vehicle communication apparatus 50 includes, as functional components, a delay time acquisition unit 11, a delay time table memory 12, a moving image acquisition unit 51, and a wireless communication unit 31. The wireless communication unit 31 includes a wireless transmission unit 32 and a request reception unit 52. In this third embodiment, as in the second embodiment described above, the wireless transmission unit 32 transmits delay time information and moving image information separately.

More specifically, the wireless transmission unit 32 first transmits wirelessly delay time information acquired by the delay time acquisition unit 11 to the second vehicle-to-vehicle communication apparatus 60. If the request reception unit 52 receives a moving image information transmission request as a response to the delay time information transmitted to the second vehicle-to-vehicle communication apparatus 60, the wireless transmission unit 32 wirelessly transmits moving image information acquired by the moving image acquisition unit 51 to the second vehicle-to-vehicle communication apparatus 60.

If the request reception unit 52 receives, as the response to the delay time information, a request for transmission of moving image information in a modified format from the second vehicle-to-vehicle communication apparatus 60, then the moving image acquisition unit 51 modifies at least one of the encoding method, the compression rate, and the frame rate of the moving image information in accordance with the request for transmission of moving image information in the modified format received by the request reception unit 52 so as to reduce the delay time that occurs when the moving image information is transmitted from the first vehicle 100 to the second vehicle 200.

When the encoding method is changed, the encoding method is changed to a method which allows encoding to be performed in a shorter time with less processing load. In a case in which the compression rate is changed, the compression ratio is increased so as to reduce the data size of the resultant compressed moving image information. On the other hand, when the frame rate is changed, the frame rate is reduced so as to reduce the data size of the moving image information. The moving image acquisition unit 51 performs the format modification process as described above and acquires the resultant moving image information.

The second vehicle-to-vehicle communication apparatus 60 includes, as functional components, a wireless communication unit 41, an allowable delay table memory 22, an applicability determination unit 23, and an application control unit 24. The wireless communication unit 41 includes a wireless reception unit 42 and a request transmission unit 61. In this third embodiment, as in the second embodiment described above, the wireless reception unit 42 receives delay time information and moving image information separately.

More specifically, the wireless reception unit 42 first receives delay time information transmitted by the wireless transmission unit 32 of the first vehicle-to-vehicle communication apparatus 50. The applicability determination unit 23 determines the applicability of moving image information, which will be transmitted from the first vehicle-to-vehicle communication apparatus 50, to an application program based on the delay time information received by the wireless reception unit 42 and the table information stored in the allowable delay table memory 22.

If the determination made by the applicability determination unit 23 is that the moving image information is applicable to the application program, the request transmission unit 61 wirelessly transmits a moving image information transmission request to the first vehicle-to-vehicle communication apparatus 50. In response to the moving image information transmission request, the first vehicle-to-vehicle communication apparatus 50 transmits moving image information, which is received by the wireless reception unit 42.

If the determination made by the applicability determination unit 23 is that the moving image information is not applicable to the application program, the request transmission unit 61 wirelessly transmits a request for transmission of moving image information in a modified format to the first vehicle-to-vehicle communication apparatus 50. In response to the request for transmission of moving image information in the modified format to the first vehicle-to-vehicle communication apparatus 50, the moving image information (with a format modified in terms of at least one of the encoding method, the compression rate, and the frame rate) is transmitted by the first vehicle-to-vehicle communication apparatus 50.

Figure 7:
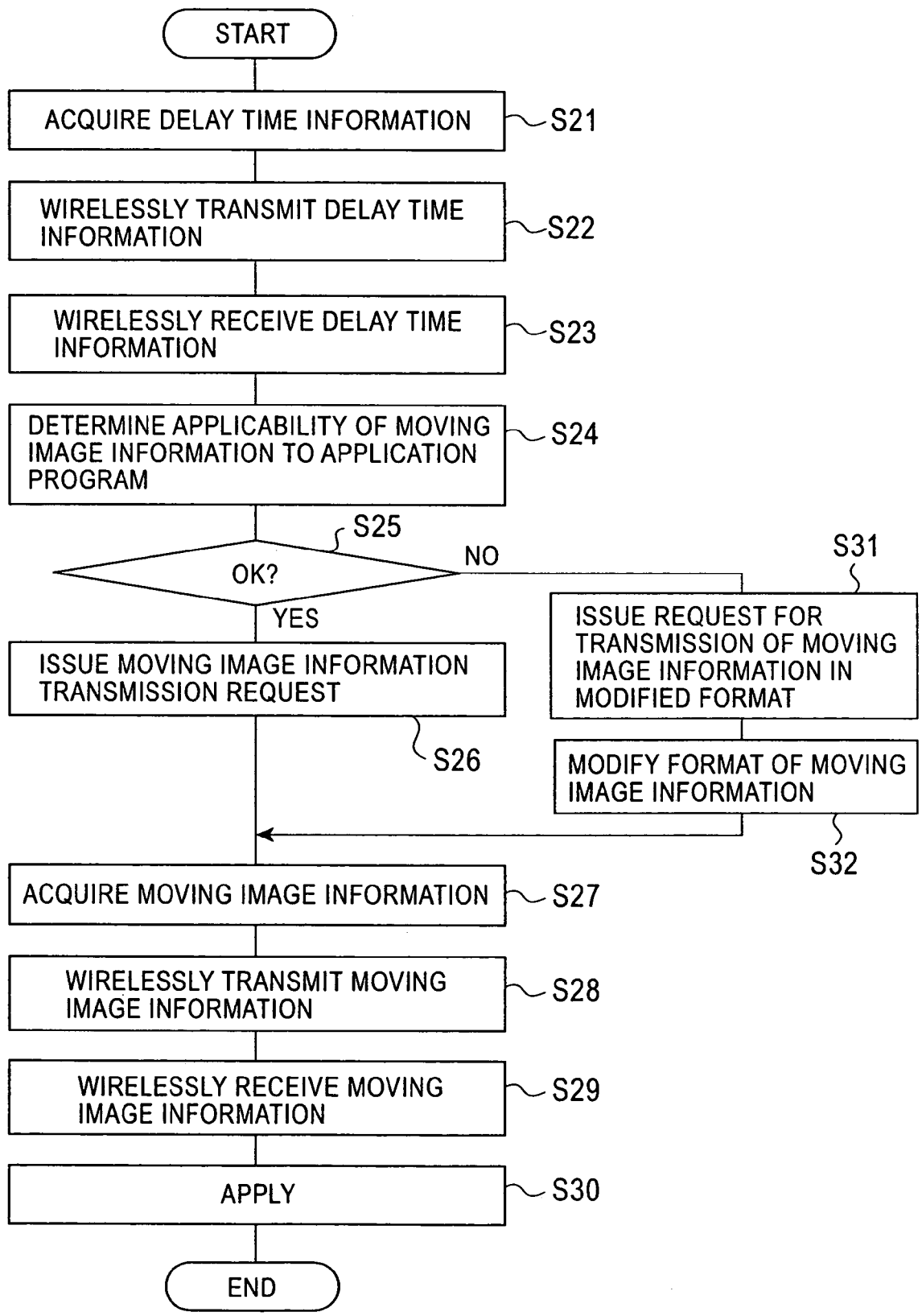
FIG. 7 is a flow chart showing the operation of a vehicle-to-vehicle communication system according to the third embodiment of the present invention.

The operation performed by the vehicle-to-vehicle communication system to determine the applicability of moving image information to application programs according to the third embodiment is described below. FIG. 7 is a flow chart showing the operation of the vehicle-to-vehicle communication system according to the third embodiment.

As shown in FIG. 7, the delay time acquisition unit 11 of the first vehicle-to-vehicle communication apparatus 50 installed in the first vehicle 100 reads data stored in the delay time table memory 12 to acquire delay time information indicating the delay time that occurs when moving image information is transmitted from the first vehicle 100 to the second vehicle 200 (step S21). The wireless transmission unit 32 transmits the delay time information acquired in step S21 to the second vehicle-to-vehicle communication apparatus 60 (step S22). The delay time information transmitted in step S22 is received by the wireless reception unit 42 of the second vehicle-to-vehicle communication apparatus 60 (step S23).

If the wireless reception unit 42 receives the delay time information, then the applicability determination unit 23 determines the applicability of moving image information, which will be transmitted from the first vehicle-to-vehicle communication apparatus 50, to an application program based on the received delay time information and the table information stored in the allowable delay table memory 22 (step S24). The request transmission unit 61 determines whether the determination made by the applicability determination unit 23 is that the moving image information is applicable to the application program (step S25). If the moving image information is determined to be applicable to the application program, the request transmission unit 61 transmits a moving image information transmission request to the first vehicle-to-vehicle communication apparatus 50 (step S26).

If the request reception unit 52 receives the moving image information transmission request, the moving image acquisition unit 51 acquires the moving image information taken by the camera 1 (step S27). The wireless transmission unit 32 transmits the moving image information acquired in step S27 to the second vehicle-to-vehicle communication apparatus 60 (step S28). The moving image information transmitted in step S28 is received by the wireless reception unit 42 of the second vehicle-to-vehicle communication apparatus 60 (step S29). The application control unit 24 sequentially supplies the moving image information received by the wireless reception unit 42 to the in-vehicle apparatus 2 so that the application program of the in-vehicle apparatus 2 can use the moving image information (step S30).

In a case in which the determination made in step S25 is that the moving image information is not applicable to the application program, the request transmission unit 61 transmits a request for transmission of moving image information in a modified format to the first vehicle-to-vehicle communication apparatus 50 (step S31). If the request reception unit 52 receives the request for transmission of moving image information in the modified format, then the moving image acquisition unit 51 modifies at least one of the encoding method, the compression rate, and the frame rate of the moving image information. Thereafter, the process proceeds to step S27.

As can be seen from the above explanation, the third embodiment provides the following advantages in addition to the advantages provided by the second embodiment described above. That is, even when moving image information taken by the first vehicle-to-vehicle communication apparatus 50 is currently in a format which requires a large delay time in transmission from the first vehicle 100 to the second vehicle 200 and thus which cannot be used by the second vehicle 200, it is possible to modify the format of the moving image information so that the moving image information can be transmitted with less delay time and thus the moving image information can be used by the second vehicle 200.

In the above explanation, by way of example, it is assumed that moving image information is transmitted from the first vehicle 100 to the second vehicle 200. Conversely, moving image information may be transmitted from the second vehicle 200 to the first vehicle 100. To this end, it is desirable that both the first vehicle 100 and the second vehicle 200 have all functions described above for the first vehicle-to-vehicle communication apparatus 50 and the second vehicle-to-vehicle communication apparatus 60.

In the first to third embodiments described above, the determination of the applicability of moving image information to application programs is made by the second vehicle 200. Alternatively, the determination may be made by the first vehicle 100. To this end, for example, the first vehicle-to-vehicle communication apparatus installed in the first vehicle 100 may include an allowable delay table memory 22 and an applicability determination unit 23. In this case, information indicating an application program currently used by the second vehicle 200 is first transmitted from the second vehicle 200 to the first vehicle 100. In the first vehicle 100, the applicability determination unit 23 determines the applicability of moving image information to application programs based on the delay time information acquired by the delay time acquisition unit 11, the application program information transmitted from the second vehicle 200, and allowable delay times described in the table information stored in the allowable delay table memory 22. If the determination is that the moving image information is applicable, the moving image information is transmitted to the second vehicle 200. On the other hand, when the determination is that the moving image information is not applicable, no moving image information is transmitted as in the second embodiment or moving image information in a modified format is transmitted as in the third embodiment.

In the first to third embodiments described above, the applicability of moving image information to an application program is determined based on a delay time which occurs when the moving image information is transmitted from the first vehicle 100 to the second vehicle 200. However, in the present invention, the determination as to the applicability may be made differently. For example, image quality information associated with the moving image information may be transmitted from the first vehicle 100 to the second vehicle 200, and the applicability of moving image information to an application program may be determined based on the image quality information.

Figure 8:
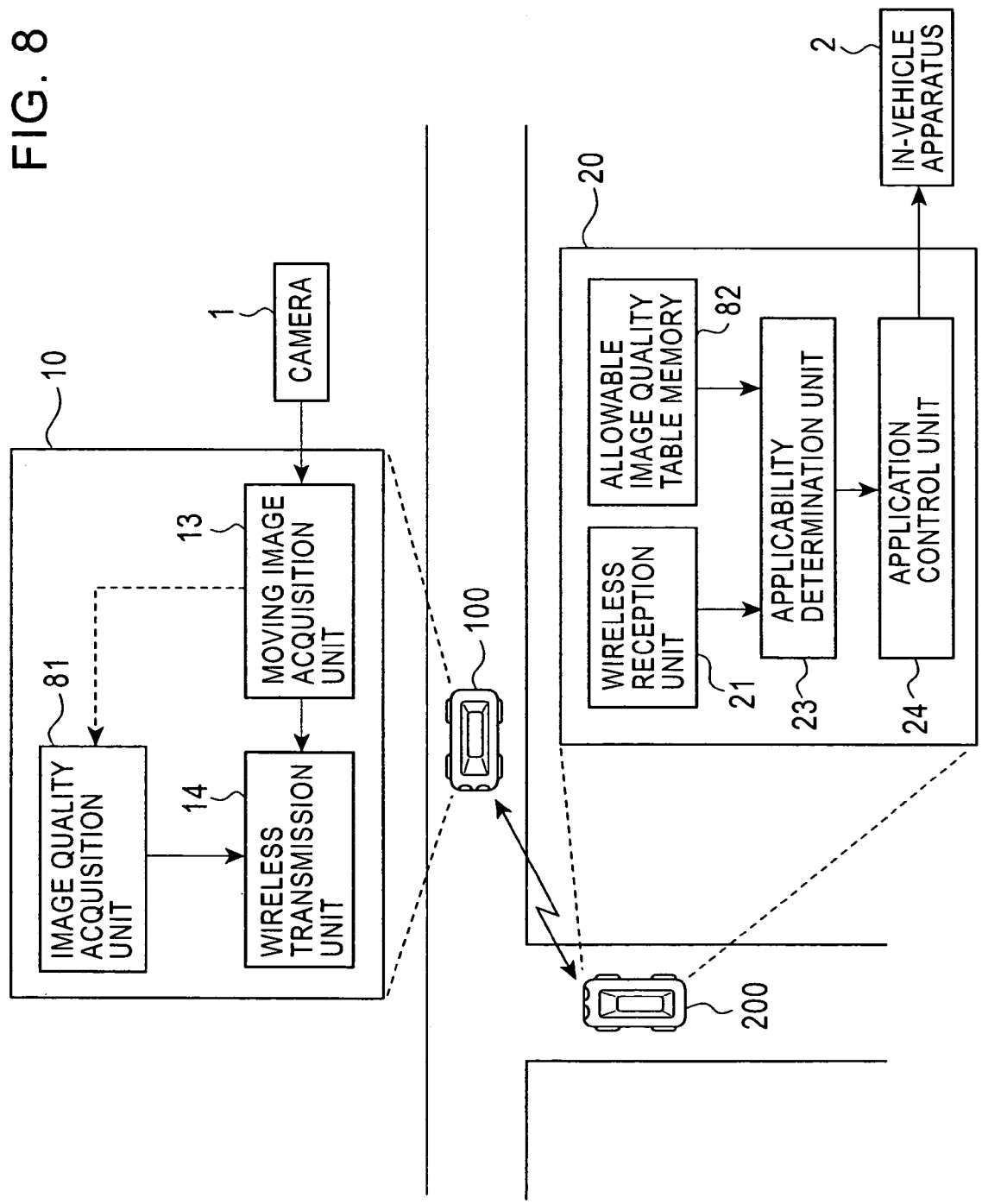
FIG. 8 is a functional block diagram showing a vehicle-to-vehicle communication apparatus and a vehicle-to-vehicle communication system using the vehicle-to-vehicle communication apparatus according to a modified embodiment of the present invention.

FIG. 8 is a functional block diagram showing an example of a vehicle-to-vehicle communication apparatus and an example of a vehicle-to-vehicle communication system using the vehicle-to-vehicle communication apparatus, which are similar to those according to the first embodiment described above except that image quality information is used instead of delay time information. In FIG. 8, parts similar to those in FIG. 1 are denoted by similar reference numerals, and a duplicated explanation thereof is omitted.

As shown in FIG. 8, a first vehicle-to-vehicle communication apparatus 10 installed in a first vehicle 100 includes an image quality acquisition unit 81 instead of the delay time acquisition unit 11 and the delay time table memory 12 shown in FIG. 1. The image quality acquisition unit 81 acquires image quality information indicating, for example, the resolution of moving image information acquired by a moving image acquisition unit 13. The moving image acquisition unit 13 is configured to acquire moving image information with a predetermined resolution, and the image quality acquisition unit 81 acquires setting information associated with the resolution thereof. The wireless transmission unit 14 wirelessly transmits the image quality information acquired by the image quality acquisition unit 81 and the moving image information acquired by the moving image acquisition unit 13 to a second vehicle-to-vehicle communication apparatus 20.

The second vehicle-to-vehicle communication apparatus 20 installed in the second vehicle 200 includes an allowable image quality table memory 82 instead of the allowable delay table memory 22. In the allowable image quality table memory 82, there is stored table information indicating allowable image quality determined for each of the application programs which use the moving image information.

FIG. 9 is a table indicating an example of the content of the table information stored in the allowable image quality table memory 82. As shown in FIG. 9, specific examples of application programs running on the in-vehicle apparatus 2 installed in the second vehicle 200 include a vehicle recognition program for collision avoidance or for merge assistance, a surrounding monitor program, a parking assistance program, a drive recorder program, a congestion monitor program, and a video telephone program.

The required resolution of moving image information varies depending on the application program. For example, when the moving image information is used in image recognition, a high resolution is required. In contrast, when the moving image information is simply displayed, a high resolution is not required. In a case in which an image taken by a camera is directly displayed, a rather high resolution is desirable. On the other hand, for an image with a low original resolution such as an image used in video telephone communication using a portable telephone, a high resolution is not required when the image is displayed. In the example shown in FIG. 9, resolutions p1 to p7 required for respective application programs are described in the form of a table in which application programs are listed in decreasing order of required resolution.

Returning to FIG. 8, the applicability determination unit 23 determines the applicability of moving image information received by the wireless reception unit 21, based on the image quality information received by the wireless reception unit 21 and the table information stored in the allowable image quality table memory 82. More specifically, when the resolution indicated by the image quality information received by the wireless reception unit 21 is compared with required resolutions described in the table information stored in the allowable image quality table memory 82, if the resolution indicated by the image quality information is higher than resolutions required for particular application programs, then it is determined that the moving image information is applicable to those particular application programs. On the other hand, when the resolution indicated by the image quality information received by the wireless reception unit 21 is compared with required resolutions described in the table information stored in the allowable image quality table memory 82, if the resolution indicated by the image quality information is lower than resolutions required for particular application programs, then it is determined that the moving image information is not applicable to those particular application programs.

In the example described above, the first embodiment is modified such that image quality information is used instead of delay time information. Note that the second embodiment and the third embodiment may also be modified such that image quality information is used instead of delay time information. In a case in which the third embodiment is modified such that image quality information is used, when the request reception unit 52 of the first vehicle-to-vehicle communication apparatus 50 receives a request for transmission of moving image information in a modified format from the second vehicle-to-vehicle communication apparatus 60, then the moving image acquisition unit 51 modifies at least one of the resolution, the encoding method, the compression rate, and the frame rate of the moving image information.

When the resolution of the moving image information is modified, the modification is performed such that the resolution is increased. When the encoding method is modified, the modification is performed such that the resultant encoded data has less degradation due to the encoding. When the compression ratio is modified, the modification is performed such that the compression rate is decreased so as to decrease degradation in image quality of the moving image information. When the frame rate is modified, the modification is performed such that the frame rate is increased so as to decrease degradation in image quality of the moving image information. The moving image acquisition unit 51 performs the format modification process as described above and acquires the resultant moving image information.

In the first to third embodiments described above, image quality information may be used in addition to delay time information such that the applicability of moving image information to application programs is determined based on both the delay time information and the image quality information. In this case, for example, the applicability determination unit 23 refers to both the allowable delay table memory 22 and the allowable image quality table memory 82 and, if both the delay time information and the image quality information satisfy the predetermined conditions, the applicability determination unit 23 determines that the moving image information is applicable to application programs.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-to-vehicle communication apparatus comprising:
   a wireless communication unit configured to wirelessly transmit and receive moving image information;
   a time delay acquisition unit configured to acquire predicted delay time information representing an estimated length of time required to transmit the moving image information from one vehicle to another vehicle via a vehicle-to-vehicle transmission performed by the wireless communication unit;
   an allowable delay table memory in which there is stored table information indicating an allowable delay time determined for at least one application program which uses the moving image information, the allowable delay time representing an allowable length of time required to transmit the moving image information from one vehicle to another vehicle; and
   an applicability determination unit configured to determine the applicability of the moving image information to the at least one application program based on whether the predicted delay time information representing an estimated length of time required to transmit the moving image information from one vehicle to another vehicle acquired by the time delay acquisition unit is less than or equal to the allowable delay time stored in the allowable delay table memory.

2. The vehicle-to-vehicle communication apparatus according to claim 1, further comprising:
   an image quality acquisition unit configured to acquire image quality information associated with the moving image information when the moving image information is transmitted between vehicles by the wireless communication unit; and
   an allowable image quality table memory in which there is stored table information indicating allowable image quality determined for the at least one application program which uses the moving image information,
   wherein the applicability determination unit determines the at least one applicability of the moving image information to the application program, based on the predicted delay time information acquired by the time delay acquisition unit, the allowable delay time stored in the allowable delay table memory, the image quality information acquired by the image quality acquisition unit, and the table information stored in the allowable image quality table memory.

3. A vehicle-to-vehicle communication system for wirelessly transmitting and receiving moving image information between a first vehicle-to-vehicle communication apparatus installed in a first vehicle and a second vehicle-to-vehicle communication apparatus installed in a second vehicle,
   the first vehicle-to-vehicle communication apparatus including:
   a time delay acquisition unit configured to acquire predicted delay time information representing an estimated length of time required to transmit the moving image information from the first vehicle to the second vehicle; and
   a wireless transmission unit configured to wirelessly transmit the predicted delay time information acquired by the time delay acquisition unit and the moving image information to the second vehicle-to-vehicle communication apparatus,
   the second vehicle-to-vehicle communication apparatus including:
   a wireless reception unit configured to receive the moving image information and the predicted delay time information transmitted from the wireless transmission unit;
   an allowable delay table memory in which there is stored table information indicating an allowable delay time determined for at least one application program which uses the moving image information, the allowable delay time representing an allowable length of time required to transmit the moving image information from one vehicle to another vehicle; and
   an applicability determination unit configured to determine the applicability of the moving image information received by the wireless reception unit to the at least one application program, based on whether the predicted delay time information representing an estimated length of time required to transmit the moving image information from the first vehicle to the second vehicle received by the wireless reception unit is less than or equal to the allowable delay time stored in the allowable delay table memory.

4. The vehicle-to-vehicle communication system according to claim 3, wherein the wireless transmission unit wirelessly transmits the moving image information together with the predicted delay time information acquired by the time delay acquisition unit to the second vehicle-to-vehicle communication apparatus.

5. The vehicle-to-vehicle communication system according to claim 3, wherein:
the first vehicle-to-vehicle communication apparatus further includes a request reception unit configured to receive a request for transmission of the moving image information, the request being issued by the second vehicle-to-vehicle communication apparatus;
the wireless transmission unit is configured to wirelessly transmit the moving image information to the second vehicle-to-vehicle communication apparatus when the request reception unit receives the request for transmission of the moving image information from the second vehicle-to-vehicle communication unit as a response to the wireless transmission of the predicted delay time information acquired by the time delay acquisition unit to the second vehicle-to-vehicle communication apparatus; and
the second vehicle-to-vehicle communication apparatus further includes a request transmission unit configured to wirelessly transmit the request for transmission of the moving image information to the first vehicle-to-vehicle communication apparatus, when the applicability determination unit determines that the moving image information is applicable to an application program.

6. The vehicle-to-vehicle communication system according to claim 5, wherein:
the request reception unit is configured to receive a request for transmission of the moving image information in a modified format, the request being generated when the applicability determination unit determines that predicted delay time information is greater than the allowable delay time and is transmitted from the second vehicle-to-vehicle communication apparatus;
the moving image acquisition unit is configured to modify at least one of an encoding method, a compression ratio, and a frame rate of the moving image information in accordance with the request for transmission of the moving image information in the modified format so as to reduce a delay time that occurs when the moving image information is transmitted from the first vehicle to the second vehicle, the request being received by the request reception unit;
the wireless transmission unit is configured such that after the wireless transmission of the predicted delay time information acquired by the delay time acquisition unit to the second vehicle-to-vehicle communication apparatus, if the request reception unit receives the request for transmission of moving image information in the modified format, the wireless transmission unit wirelessly transmits, to the second vehicle-to-vehicle communication apparatus, the moving image information in the format modified in terms of at least one of the encoding method, the compression rate, and the frame rate; and
the request transmission unit is configured such that when the applicability determination unit determines that the moving image information is not applicable to an application program, the request transmission unit wirelessly transmits the request for transmission of the moving image information in the modified format to the first vehicle-to-vehicle communication apparatus.

7. A method of determining the applicability of moving image information to an application program, comprising:
a first step in which a time delay acquisition unit included in a first vehicle-to-vehicle communication apparatus installed in a first vehicle acquires predicted delay time information indicating an estimated length of delay time required to transmit the moving image information from the first vehicle to a second vehicle;
a second step in which a wireless transmission unit included in the first vehicle-to-vehicle communication apparatus transmits the moving image information together with the predicted delay time information acquired in the first step to a second vehicle-to-vehicle communication apparatus installed in the second vehicle;
a third step in which a wireless reception unit included in the second vehicle-to-vehicle communication apparatus receives the moving image information and the predicted delay time information transmitted in the second step; and
a fourth step in which an applicability determination unit included in the second vehicle-to-vehicle communication apparatus determines the applicability of the moving image information received in the third step to the application program based on whether the predicted delay time information representing an estimated length of time required to transmit the moving image information from the first vehicle to the second vehicle received in the third step is less than or equal to an allowable delay time determined for an application program which uses the moving image information, the allowable delay time representing an allowable length of time required to transmit the moving image information from the first vehicle to the second vehicle.

8. A method of determining the applicability of moving image information to an application program, comprising:
a first step in which a time delay acquisition unit included in a first vehicle-to-vehicle communication apparatus installed in a first vehicle acquires predicted delay time information indicating an estimated length of time required to transmit the moving image information from the first vehicle to a second vehicle;
a second step in which a wireless transmission unit included in the first vehicle-to-vehicle communication apparatus transmits the predicted delay time information acquired in the first step to a second vehicle-to-vehicle communication apparatus installed in the second vehicle;
a third step in which a wireless reception unit included in the second vehicle-to-vehicle communication apparatus receives the predicted delay time information transmitted in the second step;
a fourth step in which an applicability determination unit included in the second vehicle-to-vehicle communication apparatus determines the applicability of moving image information, which will be transmitted from the first vehicle-to-vehicle communication apparatus, to the application program based on whether the predicted delay time information received in the third step is less than or equal to an allowable delay time determined for an application program which uses the moving image information;

a fifth step in which, when the determination in the fourth step is that the moving image information is applicable to the application program, a request transmission unit included in the second vehicle-to-vehicle communication apparatus transmits a request for transmission of the moving image information to the first vehicle-to-vehicle communication apparatus;

a sixth step in which a request reception unit included in the first vehicle-to-vehicle communication apparatus receives the request for transmission of the moving image information transmitted in the fifth step; and a seventh step in which when the request for transmission of the moving image information is received in the sixth step, the wireless transmission unit included in the first vehicle-to-vehicle communication apparatus transmits the moving image information to the second vehicle-to-vehicle communication apparatus.

9. The method of determining the applicability of moving image information to an application program according to claim 8, further comprising:

an eighth step in which when the determination in the fourth step is that the moving image information is not applicable to the application program because the predicted delay time information representing the estimated length of time required to transmit the moving image information from the first vehicle to the second vehicle is greater than the allowable delay time determined for the application program, the request transmission unit included in the second vehicle-to-vehicle communication apparatus transmits a request for transmission of the moving image information in a modified format to the first vehicle-to-vehicle communication apparatus;

a ninth step in which the request reception unit included in the first vehicle-to-vehicle communication apparatus receives the request for transmission of the moving image information in the modified format transmitted in the eighth step;

a tenth step in which a moving image acquisition unit included in the first vehicle-to-vehicle communication apparatus modifies at least one of an encoding method, a compression ratio, and a frame rate of the moving image information in accordance with the request for transmission of the moving image information in the modified format received in the ninth step so as to reduce a delay time that occurs when the moving image information is transmitted from the first vehicle to the second vehicle; and an eleventh step in which the wireless transmission unit included in the first vehicle-to-vehicle communication apparatus transmits the moving image information acquired as the result of the process performed in the tenth step to the second vehicle-to-vehicle communication apparatus.

\* \* \* \* \*